Aug. 18, 1953     C. O. SCHMIDT, JR., ET AL     2,648,871
CRADLE CONTROL FOR CARCASS DEHAIRING DEVICE
Filed Feb. 6, 1952     3 Sheets-Sheet 3
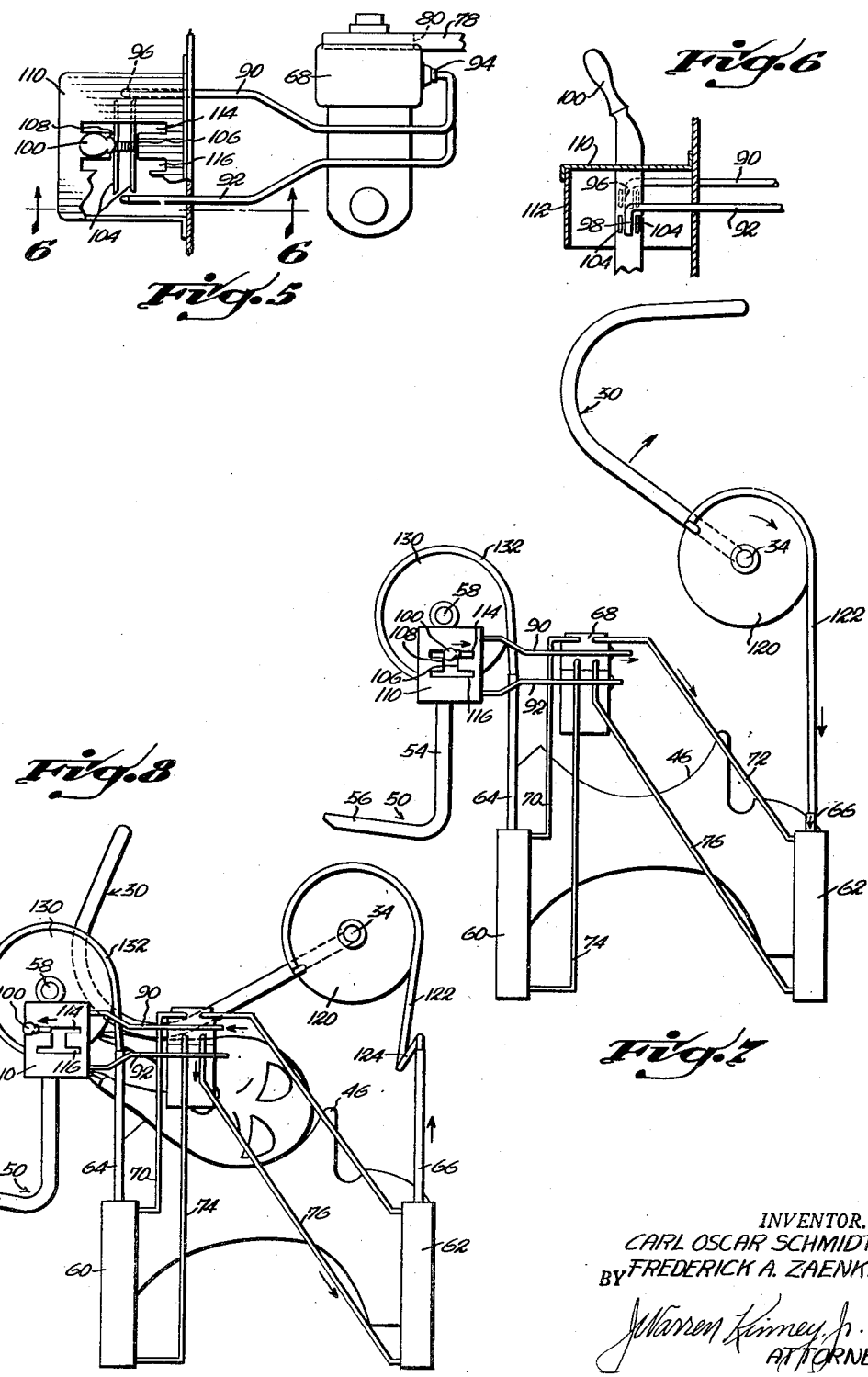
INVENTOR.
CARL OSCAR SCHMIDT JR.
BY FREDERICK A. ZAENKERT
J. Warren Kinney Jr.
ATTORNEY.

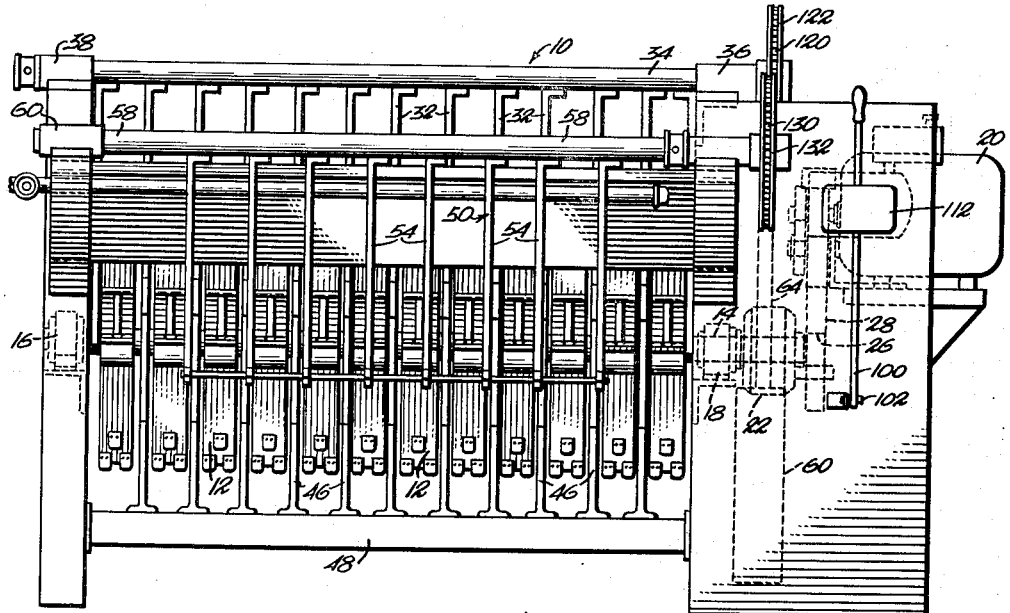

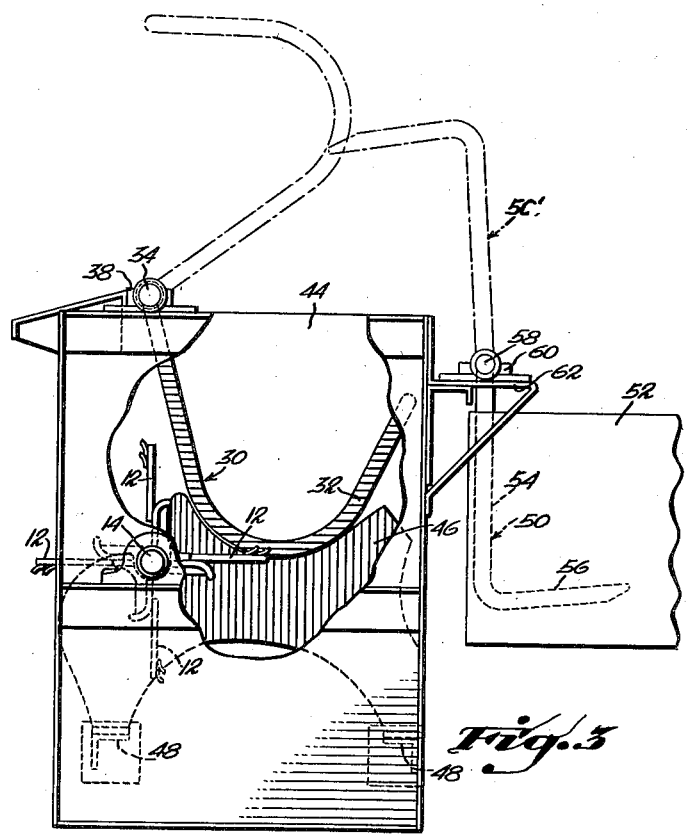
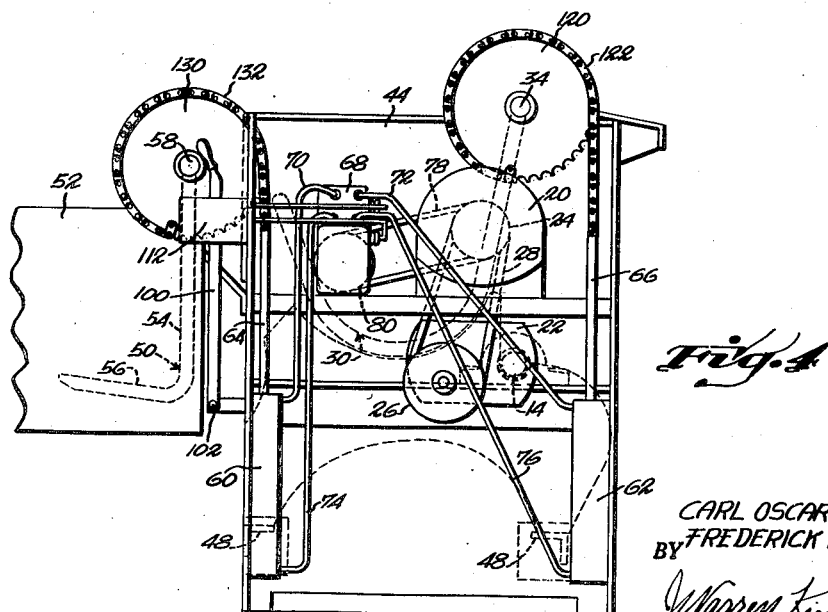

Patented Aug. 18, 1953

2,648,871

UNITED STATES PATENT OFFICE 2,648,871

CRADLE CONTROL FOR CARCASS DEHAIRING DEVICE

Carl Oscar Schmidt, Jr., Cincinnati, and Frederick A. Zaenkert, Greenhills, Ohio, assignors to The Cincinnati Butchers' Supply Company, Cincinnati, Ohio, a corporation of Ohio Application February 6, 1952, Serial No. 270,126

4 Claims. (Cl. 17—16)

This invention relates to an animal dehairing device, and more particularly to means for actuating the carcass cradle and scalding tub cradle portions thereof.

An object of the invention is to provide a carcass dehairing device with simple, highly effective, hydraulically actuated, manually controlled means for selectively and independently moving certain carcass supporting portions thereof.

Another object of the invention is to provide simple, yet highly effective, foolproof means for actuating the scalding tub and carcass cradles of a conventional dehairing device, said means constructed and arranged whereby the said cradles will be positively driven throughout their lifting cycle, the cradles being actuated during their lowering cycle solely by gravity but wherein the rate of lowering is under the control of the operator.

Heretofore considerable difficulty has been encountered in the meat packing industry in those instances when a carcass has been accidentally or unintentionally discharge into or onto the dehairing means rather than into the cradle in which the carcass should be supported during the dehairing operation. In those instances wherein the operational characteristics of the scalding tub and carcass cradles were positively correlated the carcass was usually mutilated and ofttimes the entire device would become jammed necessitating shut-down until the difficulty could be remedied.

One of the principal objects of the present invention is to preclude the concurrent operation of both cradles and to positively drive them only during their raising cycle.

A further object of the invention is to provide cradle actuating means having the hereinabove described characteristics which are controlled by a single, operator actuated lever.

These and other objects are attained by the means described herein and as disclosed in which Fig. 1 is a front elevational view of a carcass dehairing device embodying the teachings of my invention.

Fig. 2 is a top elevational view of the device of Fig. 1.

Fig. 3 is a left end view with parts broken away of the device of Fig. 1.

Fig. 4 is a right end view of the device of Fig. 1.

Fig. 5 is a synthetic view illustrating the control mechanism comprising a detail of the present invention.

Fig. 6 is a sectional view taken on line 6—6 of Fig. 5.

Fig. 7 is a diagrammatic view illustrating the relationship of the various parts incident to lifting the carcass cradle.

Fig. 8 is a view similar to Fig. 7 but showing the relationship of parts incident to lowering of the carcass cradle.

With reference now to the figures, the numeral 10 denotes generally a carcass dehairing device of the type which includes a plurality of laterally spaced sets of dehairing members 12 whose outer ends describe an annular path of travel. Dehairing members 12 may be suitably secured to a shaft 14 which extends between bearings 16 and 18 (see Fig. 1), said shaft being rotated by means of an electric motor 20, and speed reducer 22 through sprocket wheels 24 and 26 and chain 28.

The numeral 30 denotes a carcass cradle comprising a plurality of similar, laterally spaced, substantially U-shaped elements 32 secured at one end to shaft 34 rotatably mounted in bearings 36 and 38 secured to and carried by top walls 40 and 42, respectively, of the end members 44.

Adjacent elements 32 are spaced apart to provide access for dehairing elements 12, it being understood that the outer end of the dehairing elements will be projected upwardly between elements 32 incident to their rotation.

A plurality of laterally spaced stationary guide plates 46 are provided one for and immediately beneath each carcass cradle element 32, the function of said guide plates being to prevent the legs and feet of a carcass from getting under or beneath elements 32 incident to the dehairing operation, it being noted that if the legs or feet should be permitted to project below and under elements 32, these extremities would be broken and otherwise mutilated by the dehairing members. Plates 46 may be suitably secured to a pair of mounting rails 48, see Fig. 3.

The numeral 50 denotes generally a carcass loading frame or scalding tub cradle, the purpose of which is to support a carcass within scalding tub 52 preparatory to a delivery of the scalded carcass into carcass cradle 30. Preferably the carcass loading frame comprises a plurality of substantially similar, laterally spaced, substantially L-shaped elements comprising legs 54 and 56, the free outer ends of legs 54 being secured to a rotatable shaft 58 suitably journaled between bearings 60 secured to and carried by brackets 62 provided on the front of the device, see Fig. 3. A tie bar 55 spans and interconnects the various L-shaped elements for adding rigidity thereto.

The present invention is neither directed to nor concerned with the particular structural details of the dehairing members 12, carcass cradle, scalding tub cradle and guide plates 46, it being noted that these elements are old in the art, such as, by way of example, will be evident from the O. C. Schmidt U. S. Patent No. 1,600,950.

The present invention is directed to the provision of simple, inexpensive, easily controlled means for actuating the carcass cradle and scalding tub cradle or carcass loading frame from their respective lowered positions to elevated positions.

With particular reference now to Fig. 3, it will be noted that carcass cradle 30 is shiftable between the lowered scraping position indicated in solid outline and a raised gambrelling position as indicated in broken outline; likewise, the scalding tub cradle is movable from the lowered position indicated in dotted outline to a raised unloading position indicated by the numeral 50'.

In the preferred embodiment of the invention a pair of cylinders 60 and 62 are provided wherein each cylinder includes reciprocable piston rods 64 and 66, respectively. A source of fluid under pressure, indicated generally by the numeral 68, is provided, said source including two sets of valving means, one set for each of cylinders 60 and 62.

The upper ends of cylinders 60 and 62 are connected to the source of fluid under pressure by means of conduits 70 and 72, whereas the lower ends of these cylinders are connected to conduits 74 and 76, respectively. The present invention is neither directed to nor concerned with the particular structural details of the source of fluid under pressure, it being understood that any conventional device may be utilized, such as, by way of example, a hydraulic power pack such as manufactured by Vickers, Inc., of Detroit, Michigan, and in particular as described in its brochure No. 800-S, copyright 1949, by Vickers, Inc. Power is transmitted to the source of fluid under pressure, or pumping means 68 from electric motor 20 through chain 78 for connecting pulley 24 of the motor with pulley 80 of the pump.

With reference to Figs. 5 and 6, the numerals 90 and 92 denote a pair of axially shiftable control rods one end of each of which is connected with one of a pair of reciprocable valving means 94 built into pump 68. In Fig. 5 the control rods 90 and 92 and valving means 94 have been illustrated in a neutral position for precluding the flow of fluid from the pump. Axial movement of control rods 90 and 92 to the right will open their respective valving means for causing fluid to flow through conduits 70 and 72 into the upper ends of cylinders 60 and 62 for thereby retracting or lowering the piston rods into their respective cylinders. Likewise, axial movement of control rods 90 and 92 to the left, from the neutral position of Fig. 5, will actuate their respective valving means 94 for producing a flow of fluid through conduits 74 and 76 into the lower ends of cylinders 60 and 62 for thereby elevating the piston rods.

The free ends of rods 90 and 92 are provided with down-turned portions 96 and 98, respectively, see Fig. 6. A manually operable lever 100 pivotally secured at its lower end as at 102, see Fig. 1, is provided for movement throughout an H pattern for enabling the operator of the device to selectively actuate the valving means of one or the other of the cylinders for raising and lowering the cradles. As best illustrated in Figs. 5 and 6, lever 100 is provided with a pair of laterally spaced plates 104 which project on opposite sides of the lever, wherein the spacing between plates 104 is dimensioned to loosely receive down-turned portions 96 and 98 of rods 90 and 92.

When lever 100 is in the neutral or central portion of the H pattern, the down-turned portions 96 and 98 are disposed outwardly of and beyond the respective ends of plates 104, and movement of lever 100 in a plane axially of control rods 90 and 92 is effectively precluded by reason of abutments 106 and 108 provided in top wall 110 of a housing 112.

From the foregoing, it will be noted that in order to actuate the valving mechanisms, it is necessary for an operator to first shift lever 100 sideways for disposing plates 104 on opposite sides of one or the other of down-turned portions 96 and 98. The lever may then be moved forwardly or rearwardly in slots 114 and 116 for actuating one of the valving mechanisms. It will be noted that the lever and therefore the control rods and valving mechanisms must be returned to a neutral position incident to the change of flow of fluid from one end of a cylinder to the other, as well as when fluid is caused to flow from one cylinder to the other cylinder.

With particular reference now to Figs. 4 and 7, it will be noted that the carcass cradle 30 will be positively lifted from its lowered position incident to retraction or lowering of piston rod 66 into cylinder 62 incident to the flow of fluid through conduit 72 into the upper end of cylinder 62.

As best illustrated in Fig. 4, the carcass cradle and scalding tub cradle will be disposed in their fully lowered positions when piston rods 66 and 64 have been shifted outwardly to the upper end of their respective strokes.

In the preferred embodiment of the invention suitable means such as a sprocket wheel 120 is secured in driving relationship with shaft 34. A length of flexible, non-extensible material, such as, by way of example, a chain 122, is provided for positively interconnecting the upper end of piston rod 66 with sprocket 120. Therefore, as the piston rod is lowered the sprocket wheel will be rotated in a clockwise direction for positively elevating the carcass cradle.

When the valving means has been shifted to the other end of its stroke, as in Fig. 8, fluid will be introduced into the lower end of cylinder 62 through conduit 76 for thereby elevating piston rod 66. The lowering or return of the carcass cradle is effected by gravity and is induced solely by its own weight, however the rate of descent is controlled by the rate at which the piston rod 66 is expelled from cylinder 62.

This type of cradle actuating means is particularly advantageous for preventing damage to the machine and/or a carcass during those instances wherein the carcass of an animal might have been discharged onto the upper supporting surface of guide plates 46 during those periods of time when carcass cradle 30 is elevated. At this point it should be clearly understood that a carcass would be placed upon guide plates 46, as illustrated in Fig. 8, only as a result of accident or inadvertence on the part of an operator, however, such condition frequently occurs and if the carcass cradle is positively powered in its downward position, the impact of the cradle onto the misplaced carcass results in a very messy and highly undesirable situation.

By means of the drive hereinabove disclosed, the descent of the carcass cradle will be interrupted should it encounter an obstacle such as, by way of example, a carcass improperly positioned upon top of guide plates 46. When the cradle is thus stopped prior to reaching the bottom of its downward travel or lowering cycle, chain or cable 122 will merely develop a slack condition as at 124, thereby permitting the piston rod 66 to continue on its upward stroke.

Actuation of the scalding tub cradle or carcass loading frame 50 is accomplished in the same manner, it being noted that the upper end of piston rod 64 is connected to sprocket 130 of shaft 58 by means of flexible, non-extensible member 132.

From the foregoing it will be noted that we have not only provided simple, yet highly effective means for precluding the concurrent actuation of the carcass and scalding tub cradles, but we have also provided means for positively driving the cradles throughout their raising cycles while allowing them to be lowered under their own weight.

It should be understood that various changes in the structural details of the device may be made, within the scope of the appended claims, without departing from the spirit of the invention.

What is claimed is:

1. In combination with a carcass dehairing device of the type which includes a plurality of laterally spaced sets of dehairing members whose outer ends describe an annular path of travel, a carcass cradle comprising a plurality of similar, laterally spaced elements adjacent ones of which are spaced to provide access of said dehairing members to a carcass supported on said cradle, support means, means pivotally mounting said cradle on said support means for movement between lowered scraping and raised gambrelling positions relative to said dehairing members, a carcass loading frame, and means pivotally mounting said frame on said support means for movement between lowered loading and raised unloading positions relative to said carcass cradle; of a source of fluid under pressure, a pair of cylinders each including a reciprocable piston rod, one of said cylinders being associated with said cradle and the other with the loading frame, separate valving means for each cylinder for controlling the flow of fluid to opposite ends of the respective cylinders, means connecting one piston in driving relationhip with the cradle, and other means connecting the other piston in driving relationship with the loading frame, a stationary wall portion on said support means provided with a guide slot of H pattern, a manually operable lever pivotally mounted at one end on said support means and shiftable in said guide slot, control means operatively associated with each valving means extending to opposite sides of said guide slot, said lever when shifted laterally from the intermediate laterally extending portion of the guide slot into one or the other of the parallel legs of the guide slot being in position to operate the adjacent valve control means, said lever when positioned in the intermediate laterally extending portion of said guide slot being out of engagement with both of said valve control means, and said lever being shiftable from one valve actuating position to the other only after first passing through said intermediate laterally extending portion of the guide slot.

2. In combination with a carcass dehairing device of the type which includes a plurality of laterally spaced sets of dehairing members whose outer ends describe an annular path of travel, a carcass cradle comprising a plurality of similar, laterally spaced elements adjacent ones of which are spaced to provide access of said dehairing members to a carcass supported on said cradle, support means, means pivotally mounting said cradle on said support means for movement between lowered scraping and raised gambrelling positions relative to said dehairing members, a carcass loading frame, and means pivotally mounting said frame on said support means for movement between lowered loading and raised unloading positions relative to said carcass cradle; of a source of fluid under pressure, a pair of cylinders each including a reciprocable piston rod, one of said cylinders being associated with said cradle and the other with the loading frame, separate valving means for each cylinder for controlling the flow of fluid to opposite ends of the respective cylinders, means connecting one piston in driving relationship with the cradle, and other means connecting the other piston in driving relationship with the loading frame, a stationary wall portion on said support means provided with a guide slot of H pattern, a manually operable lever pivotally mounted at one end and shiftable in said guide slot, a separate control rod operatively associated with each of said valving means, said rods being axially movable and having portions extending along opposite sides of said guide slot, cooperating means on said lever, and each of said rods having a portion cooperating with the means on the lever when the lever is shifted laterally from the intermediate laterally extending portion of the guide slot into one or the other of the parallel legs of the guide slot to operatively connect the lever with the adjacent valve control rod for axial movement of the rod by movement of the lever in said leg of the guide slot, said lever when positioned in said intermediate laterally extending portion of the guide slot being out of engagement with both of said valve control rods, the lever being shiftable from one valve rod actuating position to the other only after first passing through said intermediate laterally extending portion of the guide slot.

3. The combination set forth in claim 2 and in which the portion on each valve control rod that cooperates with the means on the manually operable lever consists of a portion extending laterally from one end of the rod, and the means on the lever consists of two pairs of plates disposed at opposite sides of the lever, the plates of each of said pairs of plates extending laterally in side-by-side spaced relation from one side of the lever and adapted to receive therebetween the laterally extending portion of one of the valve control rods when the lever is shifted laterally from the intermediate laterally extending portion of the guide slot into one of the leg portions of the same.

4. In combination with a carcass dehairing device of the type which includes a plurality of laterally spaced sets of dehairing members whose outer ends describe an annular path of travel, a carcass cradle comprising a plurality of similar, laterally spaced elements adjacent ones of which are spaced to provide access of said dehairing members to a carcass supported on said cradle, support means, means pivotally mounting said cradle on said support means for movement between lowered scraping and raised gambrelling positions relative to said dehairing members, a carcass loading frame, and means pivotally mounting said frame on said support means for movement between lowered loading and raised unloading positions relative to said carcass cradle; of a source of fluid under pressure, a pair of cylinders each including a reciprocable piston, one of said cylinders being associated with said cradle and the other with the loading frame, separate valving means for each cylinder for controlling the flow of fluid to opposite ends of the respective cylinders, flexible means connecting one piston in one way driving relationship with the cradle, and other flexible means interconnecting the other piston in one way driving relationship with the loading frame, the said flexible means imparting movement of the pistons in one direction to a positive elevating action of the cradle and loading frame for moving them from their respective lowered to raised positions, the said flexible means imparting movement of the pistons in an opposite direction to control the rate of gravitational movement of the cradle and loading frame from their respective raised to lowered positions, control means operatively associated with each valving means, a manual lever operable in an H pattern for selectively actuating one or the other or neither of the said control means, said lever being shiftable from one valve actuating position to another only after first passing through the intermediate laterally extending portion of the H pattern.

CARL OSCAR SCHMIDT, Jr.
FREDERICK A. ZAENKERT.

References Cited in the file of this patent

UNITED STATES PATENTS

| Number | Name | Date |
|---|---|---|
| 1,815,929 | Newman | July 28, 1931 |
| 1,885,161 | Wernberg | Nov. 1, 1932 |
| 2,511,116 | Le Fiell | June 13, 1950 |